United States Patent [19]

Chiu

[11] Patent Number: 5,275,093
[45] Date of Patent: Jan. 4, 1994

[54] FOOD PROCESSING EQUIPMENT

[76] Inventor: Yao J. Chiu, No. 52, Tieh Hsi Ts'un, Hsi Kou Hsiang, Chiayi Hsien, Taiwan

[21] Appl. No.: 63,566

[22] Filed: May 19, 1993

[51] Int. Cl.⁵ .................................. A47J 37/12
[52] U.S. Cl. ........................ 99/408; 99/403; 99/409; 99/410; 99/472; 210/167; 210/DIG. 8
[58] Field of Search .......... 99/330, 403, 404, 407–410, 472, 416, 418; 210/167, 186, DIG. 8; 426/417; 126/391, 350R

[56] References Cited

U.S. PATENT DOCUMENTS

| | | | |
|---|---|---|---|
| 3,968,741 | 7/1976 | Hunt | 99/330 |
| 3,977,973 | 8/1976 | Anderson | 210/167 |
| 3,984,447 | 10/1976 | Cooper et al. | 426/417 |
| 4,580,549 | 4/1986 | Sato | 126/391 |
| 4,805,525 | 2/1989 | Bivens | 99/408 |
| 4,873,920 | 10/1989 | Yang | 99/472 |
| 4,882,984 | 11/1989 | Eves, II | 99/404 |
| 4,957,758 | 9/1990 | Drijftholt et al. | 210/DIG. 8 |
| 5,167,216 | 12/1992 | Yeung et al. | 99/403 |
| 5,168,797 | 12/1992 | Wang | 99/330 |
| 5,179,891 | 1/1993 | Chiu | 99/408 |

Primary Examiner—Timothy F. Simone
Attorney, Agent, or Firm—Bacon & Thomas

[57] ABSTRACT

A food processing equipment particularly adapted for frying treatment of various kinds of vegetable root, meat and marine object which are first sliced and then disposed in a drying basket for removal of moisture; afterwards, the processed food is submerged in fructose for a period of time in a frying tank, and then the fructose is discharged out of the tank with frying oil charged thereinto subsequently. The food is then fried in the frying tank for some time. The fried food taken out of the frying oil is first shaken up and down and rotationally so as to get the same deoiled in a vacuum state. The deoiled food is then blown cool by way of cold air produced by a cooling machine. Next, the cooled food is carefully seasoned so that the original color and flavor and nutrition of the processed food can be well maintained and the same is tasted crispy and can be reserved for a longer time.

4 Claims, 1 Drawing Sheet

FOOD PROCESSING EQUIPMENT

BACKGROUND OF THE INVENTION

The present invention relates to a food processing equipment which is particularly adapted for frying various kinds of vegetable root and meat and marine product in such a manner that the color and flavor of the fried food can be maintained, and the same tastes crispy and can be preserved for a longer time.

Generally, the conventional food frying process is carried out directly in the air, and the outcome of the fried food is usually not satisfactory and there are number of disadvantages given as below:

1. Frying food directly in a frying pan will often cause the skin of the same brown or scorched, with the core thereof still raw but the skin deeply fried.
2. Oil used for frying food at high temperature will be oxydized easily so that addition of anti-oxidant in the oil becomes necessary; but the so treated oil is easily turned black and sour in one aspect and the food fried in such oil will be harmful to human health in another.
3. Direct frying food in hot oil will cause the original color, flavor and nutrition thereof destroyed, and the oil content in the food is relatively high, making the taste of the food too oily.
4. Generally, such fried food can only be reserved for 6 months.

SUMMARY OF THE INVENTION

Therefore, the primary object of the present invention is to provide a food processing equipment which can get the color, flavor, nutrition of fried food well presrved even after the food is blanched, soaked, frozen and defrozen and fried in vacuum state; and the oil content of the fried food is effectively reduced with the food tasted crispy.

Another object of the present invention is to provide a food processing equipment which can reduce the oil content of fried food to such an extent that the same can be reserved more than 12 months.

One further object of the present invention is to provide a food processing equipment which can keep the fried food well shaped without distortion.

One still further object of the present invention is to provide a food processing equipment which can get the used fructose and frying oil well filtered and recycled.

DESCRIPTION OF THE PREFERRED EMBODIMENTS

Figure 1:
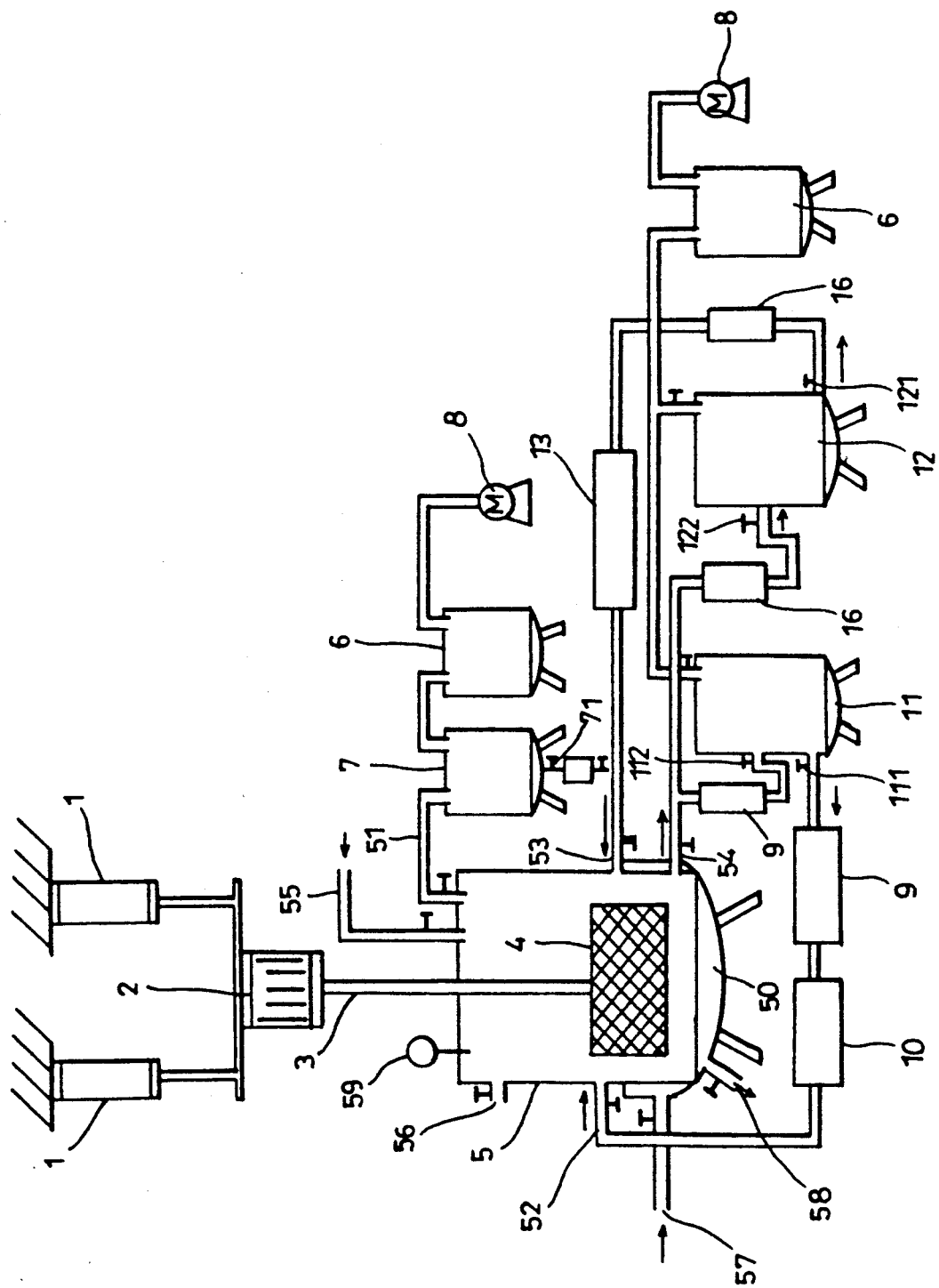
FIG. 1 is a diagram showing the layout of the present invention.

Referring to FIG. 1, the present food processing equipment particularly adapted for processing vegetable root, marine product and meat of various kinds has a number of pneumatic cylinder 1, a motor 2, a food receiving basket 4, a frying tank 5, a number of auxiliary vacuum tanks 6 and a cooling tank 7, a number of vacuum pump 8, a number of fructose filtering means 9 and oil filtering means 16, a heating unit 10 and an instant heating means 13, a fructose reservoir 11 and an oil reservoir 12.

A number of pneumatic cylinders 1 are connected to the motor 2 with the food receiving basket 4 attached to the bottom end of the extended driving shaft 3 of the motor 2 and disposed in the frying tank 5. A valve controlled pipe 51 in communication with the frying tank 5 is disposed at the top thereof and communicates with the cooling tank 7 and an auxiliary vacuum tank 6 and further with a vacuum pump 8 consecutively.

To one side of the frying tank 5 near the bottom thereof is disposed a valve controlled duct 52 in communication with a heating unit 10, a fructose filtering means 9, the fructose reservoir 11, the oil reservoir 12, an auxiliary vacuum tank 6 and a vacuum pump 8. To the other side of the frying tank 5 are connected an upper duct 53 and a lower duct 54; the former is in communication with the instant heating means 13, the oil filtering means 16, and the oil reservoir 12; the latter communicates with the fructose filtering means 9, the fructose reservoir 11, the oil filtering means 16 and the oil reservoir 12.

To the top of the frying tank 5 is connected a cold air supply duct 55 through which cold air can be led into the frying tank 5. A valve controlled vacuum removing duct 56 is disposed at one side of the frying tank 5 near the top thereof. At the bottom of the frying tank 5 in attached a steam jacket 50 having a steam inlet 57 and a steam discharge port 58 whereby the frying oil in the frying tank 5 can be indirectly heated. A pressure control meter 59 is disposed on top the frying tank 5.

In operation, the vacuum pump 8 is started to make the frying tank 5 vacuumized via the auxiliary vacuum tank 6 and the cooling tank 7. The air expelled from the frying tank 5 is led through the cooling tank 7, causing the moisture in the air to be condensed therein and dripped out of the outlet 71 of the cooling tank 7. At then, the control valve 111 of the fructose reservoir 11 is opened up so as to permit fructose to be naturally led into the frying tank 5 due to the vacuum state therein via ducts. It is intended to increase the sweetness of a fried food by provision of fructose.

After the addition of the fructose has been completed, the valve in control of the vacuum removing duct 56 is opened up so as to completely destroy the vacuum state in the frying tank 5. In the meanwhile, the motor 2 is still in operation so that the fructose adhered to the food receiving basket 4 can be shaken off due to the up and down vibration and speedy rotation. At then, another vacuum pump 8 is actuated and the inlet valve 112 of the fructose reservoir 11 is opened up whereby the fructose residue in the frying tank 5 can be recollected into the fructose reservoir 11 via the fructose filtering means 9. As the fructose in the frying tank 5 is completely recollected into the fructose reservoir 11, one vacuum pump 8 is actuated to reproduce in the frying tank 5 a vacuum state. At this moment, the outlet control valve 121 of the oil reservoir 12 is opened up so that frying oil can be led through the instant heating means 13 before entering the frying tank 5.

High temperature steam is led into the jacket 50 around the frying tank via the steam inlet 57 so as to maintain the temperature of the frying oil. The pneumatic cylinder 1 and motor 2 are started to make the food receiving basket 4 vibrate up and down and rotate at the same time whereby the food can be evenly fried.

After the completion of the frying process, air will be led into the frying tank via the vacuum removing duct 56 so as to destroy the vacuum state in the frying tank 5; in the meanwhile, another vacuum pump 8 is actuated with the assistance of the auxiliary vacuum tank 6 so that both the oil reservoir 12 and the fructose reservoir 11 are vacuumized. Since the inlet valve 111 of the fructose reservoir 11 is closed, the frying oil in the frying tank 5 is recollected into the oil reservoir 12 via the oil filtering means 16. Afterwards, cold air is led through the cold air supply duct 55 to get the fried food cool; then the food is seasoned and taken out to complete the frying process.

It can be clearly seen that the present invention has the following advantages:

1. The color, flavor, and the nutrition of the fried food can be reserved as a result of the food being evenly fried and the fabric of the food will not be broken.
2. The so fried food is crispy and can be preserved for more than a year.
3. Food will not be deformed in shape when fried in the oil, and the oil content in the fried food is effectively reduced.
4. No chemical additive is used in the present invention (such as antioxidant).
5. The frying oil and fructose can be effectively recollected.

I claim:

1. A food Processing equipment adapted for frying vegetable root and meat and marine product of various kinds, including:

a frying tank;
a food receiving basket vibrationally and rotationally actuated being disposed in said frying tank;
a fructose reservoir communicating with said frying tank;
an oil reservoir communicating with said frying tank;
a number of fructose filtering means in connection to said fructose reservoir for filtering the circulating fructose;
a heating unit in connection to one of said fructose filtering means and further said frying tank;
a cooling tank for condensing the moisture in the air removed from the frying tank being in communication with said frying tank;
a number of auxiliary vacuum tanks one of which communicates with said cooling tank and another one communicates with said oil reservoir and said fructose reservoir;
a number of oil filtering means disposed in communication with both said oil reservoir and said frying tank; each said auxiliary vacuum tank being in communication with
a number of vacuum pumps each in communicating with one of said auxiliary vacuum tanks;
an instant heating means disposed between and in communication with both said frying tank and said oil reservoir;
a steam jacket surrounded the bottom of said frying tank being provided with a steam inlet and a steam discharge port so as to permit the oil in said frying tank to be heated.

2. A food processing equipment as claimed in claim 1 wherein said food receiving basket is associated with the extended driving shaft of a motor which is mounted to pneumatically or hydraulically operated cylinders so that the same can be vibrationally and rotationally actuated.

3. A food processing equipment as claimed in claim 1 wherein said frying tank is equipped with a vacuum removing duct through which air can be led into said frying tank so as to destroy the vacuum state therein.

4. A food processing equipment as claimed in claim 1 wherein said frying tank is provided with a cold air supply duct through which cold air can be introduced into said frying tank to get the fried food cool.

* * * * *